United States Patent [19]

Kyotani et al.

[11] Patent Number: 4,664,627
[45] Date of Patent: May 12, 1987

[54] DENTAL CONTACT GAUGE

[75] Inventors: Ikuo Kyotani, Kitamoto; Kentaro Tomioka, Chofu, both of Japan

[73] Assignee: G-C Dental Industrial Corp., Tokyo, Japan

[21] Appl. No.: 777,752

[22] Filed: Sep. 19, 1985

[30] Foreign Application Priority Data

Nov. 9, 1984 [JP] Japan .................................. 59-235045

[51] Int. Cl.⁴ ............................................. A61C 19/04
[52] U.S. Cl. ..................................................... 433/72
[58] Field of Search ..................... 433/72, 71, 70, 69, 433/20

[56] References Cited

U.S. PATENT DOCUMENTS 4,037,324  7/1977  Andreasen ........................... 433/24
4,390,028  6/1983  Okano .................................. 433/71

*Primary Examiner*—Robert Peshock
*Attorney, Agent, or Firm*—Oblon, Fisher, Spivak, McClelland & Maier

[57] ABSTRACT

A dental contact gauge used for the examination of the proximal contact relation of adjacent two teeth, in which a gauge plate having a constant thickness is formed of a shape-memory alloy. As the shape-memory alloy, use is made of an alloy which is not harmful in the oral mouth, and is restored to the stored shape at a temperature of no lower than 40° C. used for sterilization in dental clinics.

4 Claims, 3 Drawing Figures

DENTAL CONTACT GAUGE

FIELD OF THE INVENTION

The present invention relates to improvements in the dental contact gauge designed to be used for the examination of the proximal contact relation (esp., the interproximal distance) of adjacent two teeth in the mouth of a patient, which is inserted into the interdentium of that patient to determine the interproximal distance.

BACKGROUND OF THE INVENTION

In odontotherapy, it has generally been carried out to remove completely morbid parts of a teeth and, then, fill a suitable restoration material therein for the adjustment of the form of a tooth. However, when the morbid parts of a tooth spread to the proximal surface of the tooth, it is required that, after restoration, the proximal contact relation (esp., the interproximal distance) of the portion of the tooth restored and the proximal surface adjacent thereto be restored to a proper state.

In the tooth that is not restored and not morbid, it is also important that the proximal contact relation (esp., the interproximal distance) of the adjacent two teeth be confirmed before restoration.

More specifically, when the proximal contact relation (esp., the interproximal distance) of adjacent two teeth in the mouth of a patient is wide, a bit of foodstuff is forced in between the teeth, so that the interdentium tends to be forced open wedgewise. Repeated and continued occurrence of such states may be responsible for diseases such as peripheral gingivitis and even peripheral paradentitis.

For that reason, gauge plates having a variety of thicknesses have been used to permit a dentist to force open the interdentium by being shifted in a mesial-distal direction, when he or she makes judgement as to whether or not that proximal contact relation (esp., the interproximal distance) is proper.

Such gauge plates are called the dental contact gauge, which comprises generally a gauge plate formed of stainless steel or steel and a grip portion which is colored corresponding to the thickness of said plate and is formed of a synthetic resin. The critical interproximal distance which the dentist can force open the interdentum to be examined by shifting in a mesial-distal direction is expressed in terms of the thickness of that gauge plate. That interproximal distance is of the order of about 70 to 92 microns in the case of young men and women. Thus, three types of dental contact gauges currently available are generally 50 microns (green grip), 110 microns (yellow grip) and 150 microns (red grip) in thickness. In diagnosis, the gauge plates are inserted into the interdentium in order of thickness from thinner gauge plate to thicker ones till it cannot be inserted therein (50 μm-110 μm-150 μm), and a dentist estimates a interproximal distance with reference to the following table.

TABLE

The criterion of diagnosis of a interproximal distance

| Insertion of Gauge Plate | Diagnosis | Interproximal distance |
| --- | --- | --- |
| Green grip (50 μm), Impossible | Narrow | Under 50 μm |
| Green grip (50 μm), Possible and Yellow grip (110 μm), Impossible | Proper | 50~110 μm |
| Yellow grip (110 μm), Possible and Red grip (150 μm), Impossible | Wide | 110~150 μm |

TABLE-continued

The criterion of diagnosis of a interproximal distance

| Insertion of Gauge Plate | Diagnosis | Interproximal distance |
| --- | --- | --- |
| Red grip (150 μm), Possible | Too wide | over 150 μm |

Thus, the dental contact gauge comprising the combinations of three types of gauge plates of 50 microns, 110 microns and 150 microns in thickness or those having similar thicknesses is frequently used. Of these plates, the gauge plates of 50 microns and 110 microns in thickness are most frequently employed. Since the interdentium of adjacent two teeth is very complicated depending upon differences in the size and form of those teeth, the gauge plates of the dental contact gauge inserted into the interdentium receive a large force, and tend to deform. In particular, the gauge plate of 50 microns thickness is of high frequency in use, and is smaller in thickness than the other gauge plates, so that it tends to bend or yield, as shown in FIG. 3. For that reason, even when the used-up dental contact gauge is cleaned and sterilized by means of gas sterilization, boiling sterilization, high-pressure steam sterilization or dry-heat sterilization, the gauge plate is left deformed, as illustrated in FIG. 3, so that difficulty is involved in the insertion thereof into the interdentium during re-use. In addition, it makes it impossible to measure accurately the interproximal distance due to the deformation thereof. Furthermore, even after it has been treated by means of gas or heating sterilization, it gives a feeling of unsanitary to a patient.

To solve the problems resulting from the manipulation and appearance of the prior art gauge plate is possible by manually putting the deformed gauge plate to the original straight shape. However, this is very troublesome to a dentist. Although the 150-micron thick gauge plate of the dental contact gauge is of lower frequency in use, as compared with the other two types of gauge plate, difficulty is encountered in the repair thereof, once it has been deformed. Even if in the short run, all the three types of gauge plates should be replaced with new ones.

OBJECT OF THE INVENTION

The main object of the present invention is to solve the manipulation, appearance and economical problems of the prior art dental contact gauge.

SUMMARY OF THE INVENTION

According to the present invention, this object is achieved by the provision of a dental contact gauge wherein a gauge plate is formed of a shape-memory alloy in place of the currently used stainless steel or steel.

BRIEF DESCRIPTION OF THE DRAWINGS

The foregoing and other objects and features of the present invention will become apparant from the following detailed explanation with reference to the accompanying drawings, which are given for the purpose of illustration alone, and in which.

Figure 1:
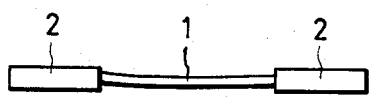
FIG. 1 is a front view showing one embodiment of the dental contact gauge according to the present invention.
Figure 2:
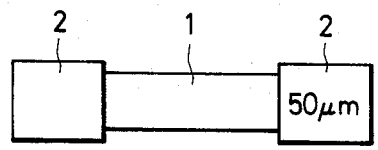
FIG. 2 is a plan view of that embodiment.
Figure 3:
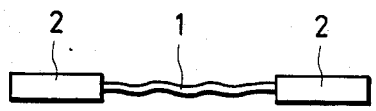
FIG. 3 is a front view of the dental contact gauge in a deformed state.

In the drawings, reference numeral 1 stands for a gauge plate for the dental contact gauge, which comprises a Ti—Ni shape-memory alloy, said alloy being restored to the memorized shape upon exposure to the given temperature. That alloy previously stores such a straight shape as illustrated in FIG. 1. It is desired that, as the shape-memory alloy used for the gauge plate 1, use be made of an alloy that is not tarnished in the oral mouth, gives no harmful influence upon the human body, and is restored to the stored shape in a range of a temperature (40° C.) slightly higher than that in the oral mouth (about 37° C.) to a temperature at which the sterilization used in dental clinics [such as, for instance, gas sterilization (55° C.), boiling sterilization (100° C.), high-pressure steam sterilization (121°–132° C.) or dry-heat sterilization (200°–250° C.)] can be used as such. In other words, the use of a shape-memory alloy which is restored to the stored straight shape at up to a temperature in the oral mouth (about 37° C.) involves difficulty in the accurate examination of the proximal contact relation (esp., the interproximal distance) of adjacent two teeth, since a force for restoring it to the straight shape is constantly exerted during diagnosis, so that there is a considerable drop of the manipulation properties. In addition, since the dental contact gauge is inserted in between the adjacent two teeth which are very complicated in form due to differences in the size and form thereof, so that it gets fixedly thereinto, a force for restoring it to the stored shape is applied thereon. Thus, difficulty is encountered in the removal of the dental contact gauge, which leads to a possibility that the normal dentition may be disturbed. That is because it is desired that the minimum temperature at which the alloy is restored to the previously stored straight shape be 40° C., taking a slight margin into consideration. It is desired that a practical temperature, which varies depending upon the type of sterilization used, be 40°–55° C. in the case of using a gas sterilizer in the gas sterilization using an ethylene oxide gas, 40°–100° C. in the case of using a boiling sterilizer in the boiling sterilization, 40°–132° C. in the case of using an autoclave in the high-pressure steam sterilization, and 40°–250° C. in the case of using a dry-heat sterilizer in the dry-heat sterilization. The alloys used as the shape-memory alloys may include Cu—Zn—Al alloys and Fe—Mn alloys in addition to the aforesaid Ti—Ni alloys.

Reference numeral 2 stands for a grip or grips which may preferably be provided at both ends of the gauge plate 1. The grip or grips are formed of synthetic resin, metal or ceramic materials which can stand up to an atmosphere used for sterilization, and are differently colored, as in the prior art.

The dental contact gauge of the present invention is used in the same manner as in the prior art contact gauge. It is removed from the predetermined storage place, and it is inserted in the interdentium of a patient for the measurement of his or her interproximal distance. Thereafter, that gauge is cleaned and sterilized at a given temperature for a given period of time in a gas sterilizer (in the case of gas sterilization), a boiling sterilizer (in the case of boiling sterilization), an autoclave (in the case of high-pressure steam sterilization, or a dry-heat sterilizer (in the case of a dry-heat sterilizer). In such a simple manner, that gauge is restored to the shape stored in the shape-memory alloy at the temperature at which sterilization is carried out.

The dental contact gauge of the present invention is free from the problems the prior art gauge poses in connection with the manipulation and appearance. Since the invented contact gauge has its gauge plate designed to be restored to the straight shape at the temperature at which gas or heating sterilization is carried out, it can be used as a new one without giving a feeling of unsanitary to a patient and with no need of carrying out operations troublesome to a dentist. Thus, the invented contact gauge can be used over and over without replacement.

What is claimed is:

1. A dental contact gauge used to measure the interproximal distance between two adjacent teeth in the same row of teeth, said dental contact gauge comprising a working portion that:
  (a) has a constant thickness and
  (b) is formed of a shape-memory alloy selected so that, after deformation by contact with the teeth during use, said working portion returns to its original shape upon being heated to a temperature at least slightly higher than the temperature of human mouths.

2. A dental contact gauge as recited in claim 1 wherein said shape-memory alloy is selected so that, after deformation by contact with the teeth during use, said working portion returns to its original shape upon being heated to a temperature in the range of 40° C. to 250° C.

3. A dental contact gauge as recited in claim 1 wherein said shape-memory alloy is selected from the group consisting of Ti—Ni shape-memory alloy, Cu—Zn—Al shape-memory alloy, and Fe—Mn shape-memory alloy.

4. A dental contact gauge as recited in claim 1 and further comprising a grip mounted at each end of said working portion.

* * * * *